Oct. 25, 1960   M. C. SCHIEFELBEIN   2,957,784
GASKET MATERIAL AND METHOD OF PRODUCING THE SAME
Filed Sept. 18, 1958
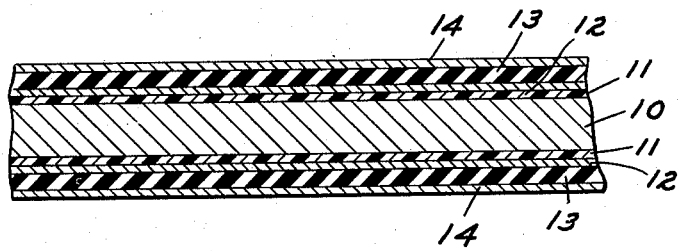
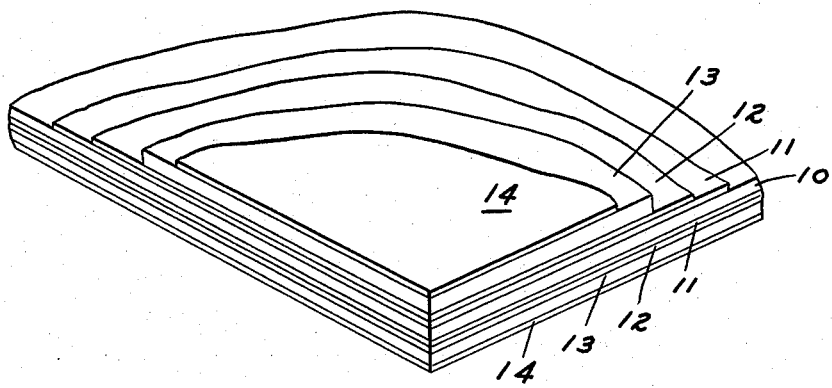
INVENTOR.
MAURICE C. SCHIEFELBEIN
BY
ATTORNEYS

United States Patent Office 2,957,784
Patented Oct. 25, 1960

2,957,784

GASKET MATERIAL AND METHOD OF PRODUCING THE SAME

Maurice C. Schiefelbein, Lincoln Park, Mich., assignor to Wolverine Fabricating & Mfg. Co., Inc., Inkster, Mich., a corporation of Michigan Filed Sept. 18, 1958, Ser. No. 761,729

5 Claims. (Cl. 117—75)

The present invention relates to an improved gasket material and to a novel method of making the same. More particularly, the invention concerns a synthetic rubber coated, aluminum base type of gasket material having wide utility in industrial and related fields, particularly in instances in which a firm and substantially non-compressible gasket base sheet is desired.

The product and method of the invention are based on a continuous operation, in which fluid layers of a solvent elastomeric system are laid down on a continuously traveling sheet or web of metal base material, and in this respect the invention is sharply distinguished from previous molding operations, involving the application of lay-ups of dry or particulate rubber to a base member, followed by molding under pressure.

A general object of the invention is to provide improved gasket material which, due to its metal base sheet, is of exceptionally high tensile strength. The base material is received in long coils of uniform thickness, such as are well suited to be fed in the continuous converting or coating equipment employed in practicing the method. This mode of operation also contributes to a high degree of uniformity of coating, enabling the finished total thickness to be held to closer tolerances than is possible in products now being used for similar purposes.

The aluminum base is also comparatively stable dimensionally, which characteristic is essential and not possessed by hygroscopic paper type gasket materials.

It is another general object of the invention to provide an aluminum base gasket material of this sort which, by reason of its improved synthetic rubber coating, has a controlled compression to effect a leak-proof seal between gasketed parts under normal bolt torque loading; which exhibits exceptional recovery properties to meet and overcome relaxation of bolt torque; and in which the rubberlike coating material, as applied to the metal base sheet in accordance with the method, is in a proper state of cure and has a firm bond to the sheet to resist deteriorative heat and/or solvent action.

This improved bond is accomplished with the assistance of an improved elastomeric primer coating applied to the base sheet, the composition of whose elastomer is similar to and specially related with that of the main coating to cure coordinately therewith.

In the evolution of a gasket material having the desirable characteristics mentioned above it has been found that agents presently available for the purpose of adhering the synthetic rubber type coating to the aluminum base, such as methylene-bis-4-phenyl-isocyanate, fail in that purpose, due to lack of adhesion at elevated temperatures up to 400° F., such failure resulting in the coating becoming loose or detached and interfering with operating components.

The invention affords a novel and improved method to overcome this difficulty, so that the product gasket material is proof against heat and chemical deterioration. The result is attained by an improved preliminary cleaning and priming procedure preceding the application of the synthetic rubber coating proper to the aluminum base. A primer coating is applied which consists primarily of a thermosetting phenolic resin and synthetic elastomer properly compounded to be activated by heat, after the main synthetic rubber coating is applied and dried, simultaneously with the activation of the latter.

The foregoing as well as other objects will become more apparent as this description proceeds, especially when considered in connection with the accompanying drawings illustrating the invention, wherein:

Fig. 1 is a fragmentary view in vertical section through a sheet of the gasket material of the invention, the relative thickness of the base sheet and several illustrated coatings not being necessarily accurately portrayed; and Fig. 2 is a fragmentary perspective view further illustrating the method and article concepts.

The improved material as shown comprises a base sheet 10 of aluminum or suitable alloy thereof which, as indicated above, may be worked, in the application of the coatings to be described, in the form of a continuous coil length, of up to 48 inches in width, and of uniform thickness, in the interest of close tolerance production as mentioned. The composition of the alloy, it will be understood, affects only the mechanical properties of the product, i.e., strength, yield, etc., and not the effectiveness of the synthetic rubber bond. My present practice contemplates thicknesses of aluminum calipering .005", .007", .008", .009", .010" and other decimal thickness up to .024", although it may be assumed that other thinner and heavier thicknesses can be converted also with changes in present manufacturing or coating equipment.

Figs. 1 and 2 show the application of similar preparatory and finish coatings to both sides of the aluminum or aluminum alloy base sheet 10, as usually desirable in gasket material; but it will be understood that certain gasket and other applications of the material may not require coating of both sides.

The reference numeral 11 designates an initial chromate conversion coating of approximately 0.0005 inch thickness (0.001 inch for the two coatings) applied on the aluminum base. This is a compound for an alodizing procedure presently marketed by Amchem Products Co., of Ambler, Pennsylvania, as Alodine #1200. An equivalent compound is prepared by Allied Research Products of Baltimore, Maryland, and sold as Iridite 14 or 14–2. A salt containing chromium ions at a pH of 1.5–1.7 (adjusted by the addition of nitric acid) is the principal constituent of these alodizing agents effecting a bond between the aluminum base and the coating to follow, designated 12.

In the event other metals are employed for base sheet 10 other bond promoting agents appropriate to those metals may be applied. Indeed, it may be necessary to make an adjustment of conversion coating 11 in the case of some few alloys of base sheet 10. In any event, the alodizing procedure is a known one, and as such is not a part of the invention, other than in the fact that the thus treated sheet affords a greater surface exposure for the adhesion of the coating 12, and thus the treating step contributes its measure to the ultimate objective of an excellently bonded coating.

The coating 12 is a primer coating applied in lacquer form, with solids dissolved in appropriate solvents, to assist in obtaining adhesion or bonding of the main coating 13 to follow. Like coating 11, it is applied in a thickness of approximately 0.0005", or total of 0.001 inch for the two applications, then dried. It is a primer developed by the Wolverine Fabricating & Mfg. Co., Inc., of Inkster, Michigan, having a thermosetting phenolic resin and a compounded butadiene acrylonitrile (Buna–N), without curatives, as its principal components. Its approximate composition (in parts by weight) is Composition "A" (Coating 12):

| | Parts |
|---|---|
| Phenolic resin | 60–40 |
| Compounded butadiene acrylonitrile | 40–60 |
| Dithiocarbamate | 1–2 |
| Mercaptobenzothiazole | 1–1.5 |
| Monomethylol dimethylhydantoin | 2.4–1.6 |
| Triethanolamine | 1–3 |
| Sulfur | 1–1.5 |

By preference, the resin and acrylonitrile are present in an approximately 60:40 ratio. The resin is a known phenolic-formaldehyde type, such as is presently marketed as Durez 12987; while the synthetic rubber ingredient is prepared as a masterbatch of the following approximate composition:

Composition "B" (Compounded acrylonitrile):

| | Parts by wt. |
|---|---|
| (a) Butadiene acrylonitrile copolymer | 100.00 |
| (b) Phenyl beta amine | 2.50 |
| (c) Polymerized trimethyl hydroquinoline | 2.50 |
| (d) Salicylic acid and inert material | 1.75 |
| Zinc oxide | 5.00 |
| (e) Paracoumarone indene resin | 40.00 |
| Stearic acid | 0.50 |
| Medium thermal black | 150.00 |
| Wax | 5.00 |

This masterbatch is similar in composition to a viscous cement stock which is hereinafter described for use as coating 13, save for the fact that curative and accelerator agents are absent. These are added during the preparation of primer coating 12 proper, per Composition "A." It is to be understood that reasonable variations are permissible in the proportioning of parts of synthetic rubber Composition "B," as is contemplated in the formulation of Composition "A."

The elastomeric butadiene acrylonitrile copolymer (a) of Composition "B" may be the product sold by B. F. Goodrich as Hycar OR–15 (1001), although equivalent products of other producers may be employed. Such equivalents are Paracril C produced by Naugatuck Chemical, subsidiary of U.S. Rubber Company, Butaprene NXM of Xylos Rubber Co., Division of Firestone Tire & Rubber Co., and the like. These products, as is well known in the art, contain a minimum of about 39% of the acrylonitrile monomer by weight of the copolymer. Components (b) and (c) are anti-oxidants preferably of the nature of Agerite powder and Agerite resin D; while component (d) is a cure retarder such as Dupont Retarder W. The zinc oxide is an actuator; component (e) is a plasticizer such as Cumar RH. Stearic acid serves as a lubricant and retarder, the medium thermal black is a reinforcing agent and filler, such as Thermax, while Heliozone is a wax and anti-stick agent.

In the Composition "A" of primer coating 12, the dithiocarbamate and mercaptobenzothiazole are accelerators for the synthetic rubber ingredient, available respectively as RZ–50 and Captax. Monomethylol dimethylhydantoin and triethanolamine are resin accelerators, and the sulfur is a curative.

The tabulated components of Composition "A" are dissolved in a mixture of ketones such as methyl ethyl and methyl isobutyl ketones and an alcohol such as ethanol, preferably in a ketone to alcohol ratio of about 7:1 by volume, to produce the desired lacquer-like consistency for coating 12. Of course the degree of viscosity is widely controllable by varying the solvent present, and therefore the proportioning of solvent agents and their ratio by volume in the coating are matters of considerable choice, hence not unduly critical in the invention.

The next coating 13 is applied as a viscous cement of approximately 15,000 cps. It is the basic Buna-N type synthetic rubber coating which gives the composite gasket material the desirable characteristics of compressibility and recovery necessary for establishing and maintaining a satisfactory seal for liquids, gases, etc. Its approximate composition is as follows:

Composition "C" (coating 13):

| | Parts by wt. |
|---|---|
| Butadiene acrylonitrile copolymer | 100.00 |
| Phenyl beta amine | 1–3 |
| Polymerized trimethyl hydroquinoline | 1–3 |
| Salicylic acid and inert material | 1–2 |
| Zinc oxide | 3–10 |
| Paracoumarone indene resin | 25–50 |
| Stearic acid | 0.5–1.5 |
| Medium thermal black | 100–200 |
| Wax | 2–6 |
| Sulfur | 2–3.5 |
| Mercaptobenzothiazole | 1–3 |
| Dithiocarbamate | 1–3 |

The tabulated components of Composition "C" have been identified above in connection with Compositions "A" and "B" and their respective roles are the same as previously described, hence need not be restated. Proportioning of parts for a given 100 parts of the Buna–N copolymer may vary, but I have found the following to be preferable:

| | Parts |
|---|---|
| Phenyl beta amine | 2.50 |
| Polymerized trimethyl hydroquinoline | 2.50 |
| Salicylic acid and inert material | 1.75 |
| Zinc oxide | 5.00 |
| Paracoumarone indene resin | 40.00 |
| Stearic acid | 0.50 |
| Medium thermal black | 150.00 |
| Wax | 5.00 |
| Sulfur | 3.00 |
| Mercaptobenzothiazole | 2.75 |
| Dithiocarbamate | 2.50 |

The above compound, when in solution to provide the viscous cement consistency referred to constitutes coating 13. The usual solvent system employed consists of monochlorobenzene and toluene in a 4:3 ratio by volume. Other systems may also be used, such as chlorinated aromatic hydrocarbons, ketones, nitromethane or nitroethane, and diluents may be aromatic hydrocarbons such as benzene, toluene or xylene.

Furthermore, other plasticizers, anti-oxidants, retarders, reinforcing fillers, lubricants and accelerators may be used to provide cement stock having practically the same physical and chemical characteristics as the one of Composition "C"; and the same applies to that of coating 12. Various resins and elastomers are also available in substitution for those preferred by me and their suitability is determinable readily by those skilled in the art.

Coating 13, as bonded and cured in the manner to be described, furnishes the desired sealing qualities, compression and recovery characteristics, oil and solvent resistance, etc., for the metal based material.

Finally, the surface lubricant, adhesion preventing coating 14 in an inert one, applied as a dispersion, and may consist of wax, graphite (preferably colloidal), molybdenum-disulphide (also preferably colloidal) or equivalents for the purpose.

In producing the material whose components have been described, the aluminum base 10 is cleaned in an alkaline cleaner at 180° to 200° F., followed by a water rinse. However, if the base sheet is very clean this preliminary may be omitted. The cleaned aluminum is next deoxidized in a dilute sulphuric acid bath containing a hexavalent chromium salt. The aluminum base is again rinsed with water.

The deoxidized aluminum is then coated with the chromate conversion coating 11, rinsed and dried. This coating may be applied to the aluminum base 10 by immersing or spraying with an alodizing solution containing hexavalent chromium ions as described above. The surface of the aluminum is an iridescent gold to brown after this treatment.

The resin-elastomer bond promoting coating 12 (Composition "A") is now applied in a lacquer form over coating 11, being dried at about 200° F. as a web of the coated stock is continuously progressed past the coating and drying instrumentalities. As compounded in the manner described, it is capable of heat curing concurrently with the main synthetic rubber coating 13.

Coating 13 is applied as a viscous cement (approx. 15,000 cps.) by a knife spreader or roller coater on the advancing stock. This coating is dried at about 210–220° F., depending on the nature of the solvent employed. As indicated, coatings 12 and 13 are compounded to cure concurrently, so as to insure a homogeneous polymerized final rubber film firmly bonded to the metal base. The cure cycle is carried out in a minimum of 6 minutes at 275° F., with ample air circulation.

This coating, like coating 12, is applied to a continuous coil or roll of aluminum and subsequently cured in the same continuous form. The process is distinctly different than those heretofore employed for obtaining rubber to metal bonds, as in molded goods where heat, pressure and relatively long "cure" times are involved.

Next, coating 14 is applied in a dispersed form to the synthetic rubber coating and dried during the continuous travel of the stock. It prevents adhesion to adjoining metal surfaces in gasket applications, is relatively inert, and has no adverse effect on the performance of the gasket, though permitting separation readily of parts gasketed and sealed thereby, and ready replacement of the gasket upon re-assembly of the parts.

Polyacrylic or chloroprene elastomers may also be used in coating 13 instead of the butadiene acrylonitrile. If a polyacrylic elastomer is used in coating 13, it will be entirely serviceable at sustained temperatures of 400° F. and ambient temperatures up to 500° F. Chloroprene elastomers will produce coatings resistant to some ketones and refrigeration heat transfer media. Naturally, appropriate changes in the composition of primer coating 12 will be called for if the polyacrylic or chloroprene elastomers are used in coating 13.

Drying and curing operations all take place at atmospheric pressure, without recourse to press-curing, calendaring, etc., as has been the case heretofore, and it is possible to produce a coated gasket sheet of extremely uniform and close tolerance thickness by this procedure.

The composite material produced by the above procedure has exceptional tensile and yield strength and is dimensionally stable. It provides excellent seals for oils, fuels, gases and other fluids, particularly refrigerants, at normal and elevated temperatures. Other uses are also contemplated, as in shims, linings, weather exposed surfaces, etc. Thicknesses are very uniform and an exceptionally low decrease in thickness is experienced in gasket applications requiring high flange pressures, even at relatively high temperatures. The material has the unique property of retaining full bolt torque after sustained periods of use, showing torque gain in assemblies rather than the generally accepted torque loss found in other materials. This characteristic is quite unique and is responsible in considerable measure for the acceptance of the composite product by the trade.

Aluminum is preferred for the flexible base sheet 10 because of its desirable physical characteristics, and its wide availability at low cost and in wide sizes and narrow gauges. However, it is to be understood that other metals or alloys such as copper or steel may also be employed when their performance is suitable for the intended purpose.

What I claim as my invention is:

1. A heat and solvent resistant sheet material comprising a base sheet surface-treated by a conversion agent containing hexavalent chromium ions, a coating containing a cured butadiene acrylonitrile copolymer applied to a thus treated surface of said sheet and bonded to the latter in a highly uniform thickness in the curing thereof, said coating being so bonded by the aid of a cured bonding agent containing a butadiene acrylonitrile copolymer and a phenolic resin in substantially equal parts by weight, said last named copolymer and resin constituting the major solid components by weight of the bonding agent, said bond being effective at temperatures to 400° F.

2. A heat and solvent resistant sheet material comprising a base sheet surface-treated by a conversion agent containing hexavalent chromium ions, a coating containing a cured butadiene acrylonitrile copolymer applied to a thus treated surface of said sheet and bonded to the latter in a highly uniform thickness in the curing thereof, said coating being so bonded by the aid of cured bonding agent containing a butadiene acrylonitrile copolymer and a phenolic resin in substantially equal parts by weight, said last named copolymer and resin constituting the major solid components by weight of the bonding agent, said bond being effective at temperatures to 400° F., said coating and bonding agent containing a minimum of about 39% of acrylonitrile monomer by weight of said copolymer.

3. A method of producing coated gasket or like material, comprising applying a liquid bond promoting coating to a metal sheet surface which has been treated by a conversion agent containing hexavalent chromium ions, said coating containing a butadiene acrylonitrile copolymer and a phenolic resin in substantially equal parts by weight constituting the substantial bulk of solids of said coating, drying said coating, applying to the coated surface a further liquid coating containing a butadiene acrylonitrile copolymer, and simultaneously heat curing said coatings to bond the same to one another and to said treated base surface in the absence of locally applied pressure in the curing, said copolymers of said bond promoting and further coatings containing a minimum of about 39% of acrylonitrile monomer by weight.

4. A method of producing coated gasket or like material, comprising applying a liquid bond promoting coating to a metal sheet surface which has been treated by a conversion agent containing hexavalent chromium ions, said coating containing a butadiene acrylonitrile copolymer and a phenolic resin in substantially equal parts by weight constituting the substantial bulk of solids of said coating, drying said coating, applying to the coated surface a further liquid coating containing a butadiene acrylonitrile copolymer, and simultaneously heat curing said coatings to bond the same to one another and to said treated base surface, while continuously advancing said surface in the coating and curing thereof, in the absence of locally applied pressure in the curing, said curing being carried out at a sufficiently high temperature and for a sufficient time to enable the bond to the finally coated surface to withstand failure at temperatures up to 400° F.

5. A method of producing coated gasket or like material comprising applying a liquid bond promoting coating to a metal sheet surface which has been treated by a conversion agent containing hexavalent chromium ions, said coating containing a butadiene acrylonitrile copolymer and a phenolic resin in substantially equal parts by weight constituting the substantial bulk of solids of said coating, drying said coating, applying to the coated surface a further liquid coating containing a butadiene acrylonitrile copolymer, and simultaneously heat curing said coatings to bond the same to one another and to said treated base surface, while continuously advancing said surface in the coating and curing thereof, in the absence of locally applied pressure in the curing, said copolymers of said bond promoting and further coatings containing a minimum of about 39% of acrylonitrile monomer by weight, said curing being carried out at a sufficiently high temperature and for a sufficient time to enable the bond to the finally coated surface to withstand failure at temperatures up to 400° F.

References Cited in the file of this patent

UNITED STATES PATENTS

| | | |
|---|---|---|
| 1,762,336 | Kirschbraun | June 10, 1930 |
| 1,785,081 | Haertel | Dec. 16, 1930 |
| 1,931,309 | Thompson | Oct. 17, 1933 |
| 2,245,122 | Balfe | June 10, 1941 |
| 2,491,477 | Chmiel | Dec. 20, 1949 |
| 2,514,196 | Bradley | July 4, 1950 |
| 2,581,920 | Kuhn | Jan. 8, 1952 |
| 2,581,926 | Groten et al. | Jan. 8, 1952 |
| 2,851,385 | Spruance et al. | Sept. 9, 1958 |

FOREIGN PATENTS

| | | |
|---|---|---|
| 134,861 | Australia | Oct. 24, 1949 |

OTHER REFERENCES

Burns and Bradley, Protective Coatings for Metals, second edition 1955, Reinhold Pub. Corp., page 431.